(12) United States Patent
Godiwala et al.

(10) Patent No.: US 7,773,617 B2
(45) Date of Patent: Aug. 10, 2010

(54) SYSTEM AND METHOD FOR ARBITRATION FOR VIRTUAL CHANNELS TO PREVENT LIVELOCK IN A RICHLY-CONNECTED MULTI-PROCESSOR COMPUTER SYSTEM

(75) Inventors: Nitin Godiwala, Boylston, MA (US); Judson S. Leonard, Newton, MA (US); Matthew H. Reilly, Stow, MA (US)

(73) Assignee: SiCortex, Inc., Maynard, MA (US)

( * ) Notice: Subject to any disclaimer, the term of this patent is extended or adjusted under 35 U.S.C. 154(b) by 604 days.

(21) Appl. No.: 11/594,420

(22) Filed: Nov. 8, 2006

(65) Prior Publication Data

US 2008/0109586 A1    May 8, 2008

(51) Int. Cl.
*H04L 12/28* (2006.01)
*H04L 12/56* (2006.01)

(52) U.S. Cl. ............... 370/409; 370/397; 370/414; 370/400

(58) Field of Classification Search ............ None
See application file for complete search history.

(56) References Cited

U.S. PATENT DOCUMENTS

| | | | | |
|---|---|---|---|---|
| 5,157,692 A | * | 10/1992 | Horie et al. | 375/260 |
| 5,701,416 A | * | 12/1997 | Thorson et al. | 712/11 |
| 6,104,700 A | * | 8/2000 | Haddock et al. | 370/235 |
| 6,243,358 B1 | * | 6/2001 | Monin | 370/229 |
| 6,370,145 B1 | * | 4/2002 | Dally et al. | 370/400 |
| 6,674,720 B1 | * | 1/2004 | Passint et al. | 370/235 |
| 6,717,912 B1 | * | 4/2004 | Lemyre et al. | 370/230 |
| 6,751,698 B1 | * | 6/2004 | Deneroff et al. | 710/317 |
| 6,915,372 B2 | * | 7/2005 | Magill et al. | 710/317 |
| 7,187,679 B2 | * | 3/2007 | Dally et al. | 370/400 |
| 2002/0071387 A1 | * | 6/2002 | Horiguchi et al. | 370/229 |
| 2003/0210686 A1 | * | 11/2003 | Terrell et al. | 370/389 |
| 2004/0066758 A1 | * | 4/2004 | Van Doren et al. | 370/329 |
| 2004/0078482 A1 | * | 4/2004 | Blumrich et al. | 709/238 |
| 2007/0147422 A1 | * | 6/2007 | Urano et al. | 370/468 |

OTHER PUBLICATIONS

W. J. Dally and C. L. Seitz. Deadlock-free message routing in multiprocessor interconnection networks. IEEE Transactions on Computers, C-36(5): 547-553, 1987.*

* cited by examiner

*Primary Examiner*—Ayaz R Sheikh
*Assistant Examiner*—Peter Chau
(74) *Attorney, Agent, or Firm*—Chapin IP Law, LLC; Barry W. Chapin, Esq.

(57) ABSTRACT

Systems and methods for arbitrating for virtual channels to prevent livelock in richly-connected multiprocessor computer system. Livelock is prevented in a multiprocessor computer system, in which each of a large plurality processing node has input links and egress links. A virtual channel is assigned to convey the communication. Communication data from the plurality of input links is buffered in cross point buffers. A subset of the cross point buffers bids for, and arbitrates, use of the same one egress link. The virtual channel of the selected communication is identified. It is determined whether any of the other communications bidding for use of the egress link are associated with the identified virtual channel and if so whether any communication has been waiting longer than the selected communication. If so, allowing that communication to use the egress link before the selected communication does.

16 Claims, 7 Drawing Sheets

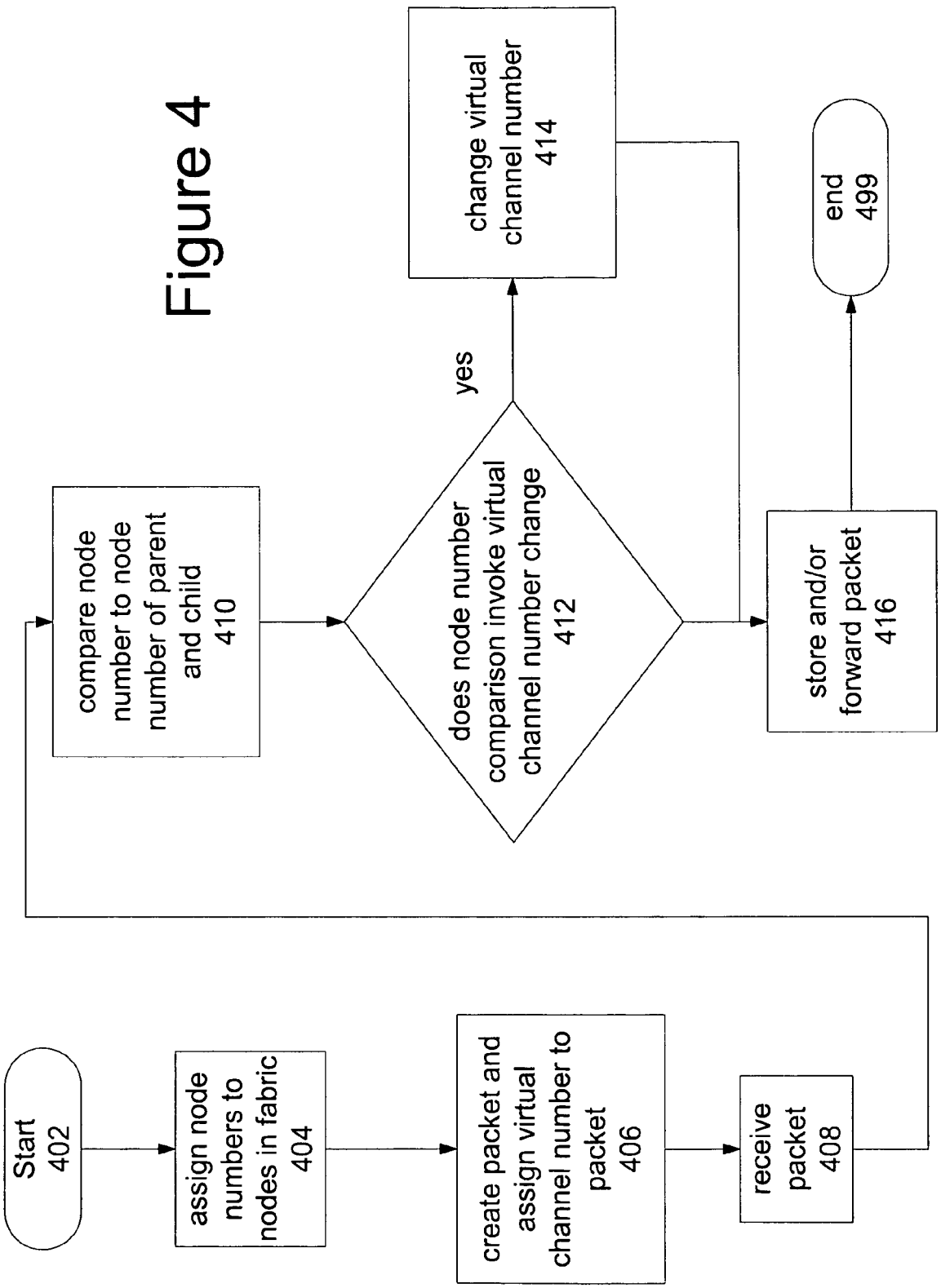

Stage 1 Contenders

Three out of four XBs request. The requests are shown, along with their VC and NextPort.

| XB02, VC=4, NP=7 |
| XB12, VC=0, NP=3 |
| XB22, not active |
| XB32, VC=0, NP=3 |

← 502

Stage 1 Arbitration

Find Least Recently Chosen XB that is requesting. Use a 4x4 Age Vector Matrix.

|      | XB02 | XB12 | XB22 | XB32 |
|------|------|------|------|------|
| XB02 | 0    | 1    | 0    | 0    |
| XB12 | 0    | 0    | 0    | 0    |
| XB22 | 0    | 1    | 0    | 1    |
| XB32 | 1    | 1    | 0    | 0    |

This table shows the XB12 won least recently, followed by XB22, then XB02. XB32 won most recently. Eliminate the rows and columns for the one that is not requesting, and look for a row full of zeroes. XB12 is the winner.

↙ 504

Stage 1 Result

The stage 1 winner is:

| XB12, VC=0, NP=3 |

Any requests with the same VC and NextPort will proceed to stage 2.

← 506

Stage 2 Contenders

There are two contenders which had the same VC and NextPort as the stage 1 winner.

| XB12, VC=0, NP=3 |
| XB32, VC=0, NP=3 |

← 508

Stage 2 Arbitration

Do Round Robin by NextPort+VC using a 64-entry Table of which XB won last.

| vc 0, nextport 0 | XB02 |
| vc 0, nextport 1 | XB32 |
| vc 0, nextport 2 | XB03 |
| vc 0, nextport 3 | XB12 |
| vc 1, nextport 0 | XB02 |
| ... | ... |
| vc 14, nextport 3 | XB22 |
| vc 15, nextport 0 | XB22 |
| vc 15, nextport 1 | XB12 |
| vc 15, nextport 2 | XB02 |
| vc 15, nextport 3 | XB32 |

↖ 510

Stage 2 Result

Last time there was a stage 2 alt for VC=0, NP=3, the table says that XB12 won. Give it lowest priority this time. XB32 is the winner.

| XB32, VC=0, NP=3 |

Last step: Update the stage 1 age vector and stage 2 history table.

SYSTEM AND METHOD FOR ARBITRATION FOR VIRTUAL CHANNELS TO PREVENT LIVELOCK IN A RICHLY-CONNECTED MULTI-PROCESSOR COMPUTER SYSTEM

CROSS-REFERENCE TO RELATED APPLICATIONS

This application is related to the following U.S. patent applications, the contents of which are incorporated herein in their entirety by reference:

U.S. patent application Ser. No. 11/335,421, filed Jan. 19, 2006, entitled SYSTEM AND METHOD OF MULTI-CORE CACHE COHERENCY;

U.S. patent application Ser. No. 11/594,416, filed on an even date herewith, entitled COMPUTER SYSTEM AND METHOD USING EFFICIENT MODULE AND BACKPLANE TILING TO INTERCONNECT COMPUTER NODES VIA A KAUTZ-LIKE DIGRAPH;

U.S. patent application Ser. No. 11/594,426, filed on an even date herewith, entitled SYSTEM AND METHOD FOR PREVENTING DEADLOCK IN RICHLY-CONNECTED MULTI-PROCESSOR COMPUTER SYSTEM USING DYNAMIC ASSIGNMENT OF VIRTUAL CHANNELS;

U.S. patent application Ser. No. 11/594,421, filed on an even date herewith, entitled LARGE SCALE MULTI-PROCESSOR SYSTEM WITH A LINK-LEVEL INTERCONNECT PROVIDING IN-ORDER PACKET DELIVERY;

U.S. patent application Ser. No. 11/594,442, filed on an even date herewith, entitled MESOCHRONOUS CLOCK SYSTEM AND METHOD TO MINIMIZE LATENCY AND BUFFER REQUIREMENTS FOR DATA TRANSFER IN A LARGE MULTI-PROCESSOR COMPUTING SYSTEM;

U.S. patent application Ser. No. 11/594,427, filed on an even date herewith, entitled REMOTE DMA SYSTEMS AND METHODS FOR SUPPORTING SYNCHRONIZATION OF DISTRIBUTED PROCESSES IN A MULTIPROCESSOR SYSTEM USING COLLECTIVE OPERATIONS;

U.S. patent application Ser. No. 11/594,423, filed on an even date herewith, entitled COMPUTER SYSTEM AND METHOD USING A KAUTZ-LIKE DIGRAPH TO INTERCONNECT COMPUTER NODES AND HAVING CONTROL BACK CHANNEL BETWEEN NODES;

U.S. patent application Ser. No. 11/594,441, filed on an even date herewith, entitled LARGE SCALE COMPUTING SYSTEM WITH MULTI-LANE MESOCHRONOUS DATA TRANSFERS AMONG COMPUTER NODES;

U.S. patent application Ser. No. 11/594,405, filed on an even date herewith, entitled SYSTEM AND METHOD FOR COMMUNICATING ON A RICHLY CONNECTED MULTI-PROCESSOR COMPUTER SYSTEM USING A POOL OF BUFFERS FOR DYNAMIC ASSOCIATION WITH A VIRTUAL CHANNEL;

U.S. patent application Ser. No. 11/594,443, filed on an even date herewith, entitled RDMA SYSTEMS AND METHODS FOR SENDING COMMANDS FROM A SOURCE NODE TO A TARGET NODE FOR LOCAL EXECUTION OF COMMANDS AT THE TARGET NODE;

U.S. patent application Ser. No. 11/594,447, filed on an even date herewith, entitled SYSTEMS AND METHODS FOR REMOTE DIRECT MEMORY ACCESS TO PROCESSOR CACHES FOR RDMA READS AND WRITES; and U.S. patent application Ser. No. 11/594,446, filed on an even date herewith, entitled SYSTEM AND METHOD FOR REMOTE DIRECT MEMORY ACCESS WITHOUT PAGE LOCKING BY THE OPERATING SYSTEM.

BACKGROUND

1. Field of the Invention

This invention relates to livelock prevention in richly-connected multiprocessor computer systems and more specifically to virtual channel techniques to prevent livelock in large multi-node computing systems interconnected by complicated topologies, including but not limited to Kautz and de Bruijn topologies.

2. Description of the Related Art

Massively parallel computing systems have been proposed for scientific computing and other compute-intensive applications. The computing system typically includes many nodes, and each node may contain several processors. Various forms of interconnect topologies have been proposed to connect the nodes, including Hypercube topologies, butterfly and omega networks, tori of various dimensions, fat trees, and random networks.

One of the problems encountered in building computer systems with complex, richly-connected communication networks is deadlock. Deadlock is the condition or situation in which actions are mutually blocked from progress because they are waiting for some form of resource. That is, some form of cycle of resource dependency exists that cannot be satisfied.

FIG. 1 depicts a simple communications system to illustrate the deadlock problem. In FIG. 1, the system has three nodes, 102, 104, and 106, each with a communication buffer, 108, 110, and 112 respectively. The buffers are resources the nodes need to send, or receive, data to, or from, a connected node (as suggested with links 114, 116, and 118). For node 102 to send its data forward from buffer 108 to buffer 110 in node 104, buffer 110 must be empty, free, or available. In this example, however, there is a cycle of resource dependency. That is, each node needs the adjacent node's buffer to be empty so that it can transmit data to an empty buffer (and not overwrite data in the buffer prematurely). Since a cycle exists from node 102, 104, and 106 and back to 102, the potential exists that no node will be able to send traffic forward, and each node will be waiting for the adjacent node's buffer to empty. FIG. 1 thus shows a system susceptible to deadlock.

Many communication architectures and protocols, including TCP/IP and the global telephone network, address the deadlock issue by discarding traffic whenever a potential deadlock situation arises. This approach, however, imposes a substantial cost in any higher-level protocol which aims to be reliable, because it must recognize and recover from the loss of message traffic. It is therefore very desirable to provide guarantees against deadlock, as opposed to detection of such and then discarding of traffic.

Another well-known strategy for deadlock prevention is the use of "virtual channels," as described by Dally and Seitz. W. J. Dally and C. L. Seitz. Deadlock-free message routing in multiprocessor interconnection networks. IEEE Transactions on Computers, C-36(5): 547-553, 1987. This approach assigns a separate set of buffers for traffic on each virtual channel, and structures the flow of data through those virtual channels such that there is no cycle of dependency among the channels. By preventing cycles, this strategy ensures that all traffic is able to leave the network, and therefore that deadlock does not occur. Virtual channel assignment is constant. A communication travels on its route using the same virtual channel assignment throughout. Typically buffer resources are mapped and fixed to virtual channel assignments.

Another potential problem in richly-connected networks is the issue of livelock or starvation. In this situation, an action is starved (as opposed to blocked) from getting access to necessary resources. Typically, timers are used to age the action. If the action gets old enough, then its priority may be elevated to increase the probability that it will win arbitration when contending for a required resource (such as access to a buffer or output link).

SUMMARY

The invention provides systems and methods for arbitrating for virtual channels to prevent livelock in richly-connected multiprocessor computer system.

Under one aspect of the invention, livelock is prevented in a multiprocessor computer system having a large plurality of processing nodes interconnected by a defined interconnection topology, in which a communication from a source processing node to a target processing node may pass through one or more intermediate nodes en route to the target processing node, and in which each processing node has a plurality of input links and a plurality of egress links. A set of virtual channels is associated with each link in the interconnection topology. Each virtual channel has an associated virtual channel identifier. For each communication between a source processing node and a target processing node, a virtual channel is assigned to convey the communication. At a processing node in the route of the communication, communication data from the plurality of input links is buffered in cross point buffers, each communication at least specifying a virtual channel identifier. A subset of the cross point buffers bids for, and arbitrates, use of the same one egress link. A communication is selected based on predetermined arbitration rules. The virtual channel of the selected communication is identified. It is determined whether any of the other communications bidding for use of the egress link are associated with the identified virtual channel and if so whether any communication has been waiting longer than the selected communication. If so, allowing that communication to use the egress link before the selected communication does.

Under another aspect of the invention, a history structure is used to record which crosspoint buffer has used the egress link and the virtual channel identifier for the communication when the egress link was used, and wherein the method consults the history structure to determine whether a communication has been waiting longer to use the egress link.

BRIEF DESCRIPTION OF THE FIGURES

In the Drawing,

FIG. 4 is a flow chart depicting dynamic virtual channel assignment according to certain embodiments of the invention;

FIG. 5 depicts the arbitration scheme for an egress link according to certain embodiments of the invention.

DETAILED DESCRIPTION

Preferred embodiments of the invention use a virtual channel technique to prevent deadlock in richly-connected multiprocessor computer systems. By using virtual channels, there is no need to detect deadlock and discard traffic. Moreover, the inventive technique uses virtual channel assignments more efficiently than conventional virtual channel approaches. In addition, arbitration logic is provided which avoids livelock of packet transmission on virtual channels and does not require timer circuitry. Moreover, a pool of buffers is provided and buffers are dynamically allocated to virtual channels; thus a virtual channel may utilize more than one buffer at a node to improve data latency.

To discuss preferred embodiments of the invention, first an exemplary richly-connected computer topology is described. Then the virtual channel technique is discussed in the context of the exemplary topology. It will be appreciated that the virtual channel technique may be employed in topologies other than the exemplary one.

Exemplary Embodiment of a Richly-connected Computer Topology

Certain embodiments of the invention are utilized on a large scale multiprocessor computer system in which computer processing nodes are interconnected in a Kautz interconnection topology. Kautz interconnection topologies are unidirectional, directed graphs (digraphs). Kautz digraphs are characterized by a degree k and a diameter n. The degree of the digraph is the maximum number of arcs (or links or edges) input to or output from any node. The diameter is the maximum number of arcs that must be traversed from any node to any other node in the topology.

The order O of a graph is the number of nodes it contains. The order of a Kautz digraph is $(k+1)k^{n-1}$. The diameter of a Kautz digraph increases logarithmically with the order of the graph.

Figure 1:
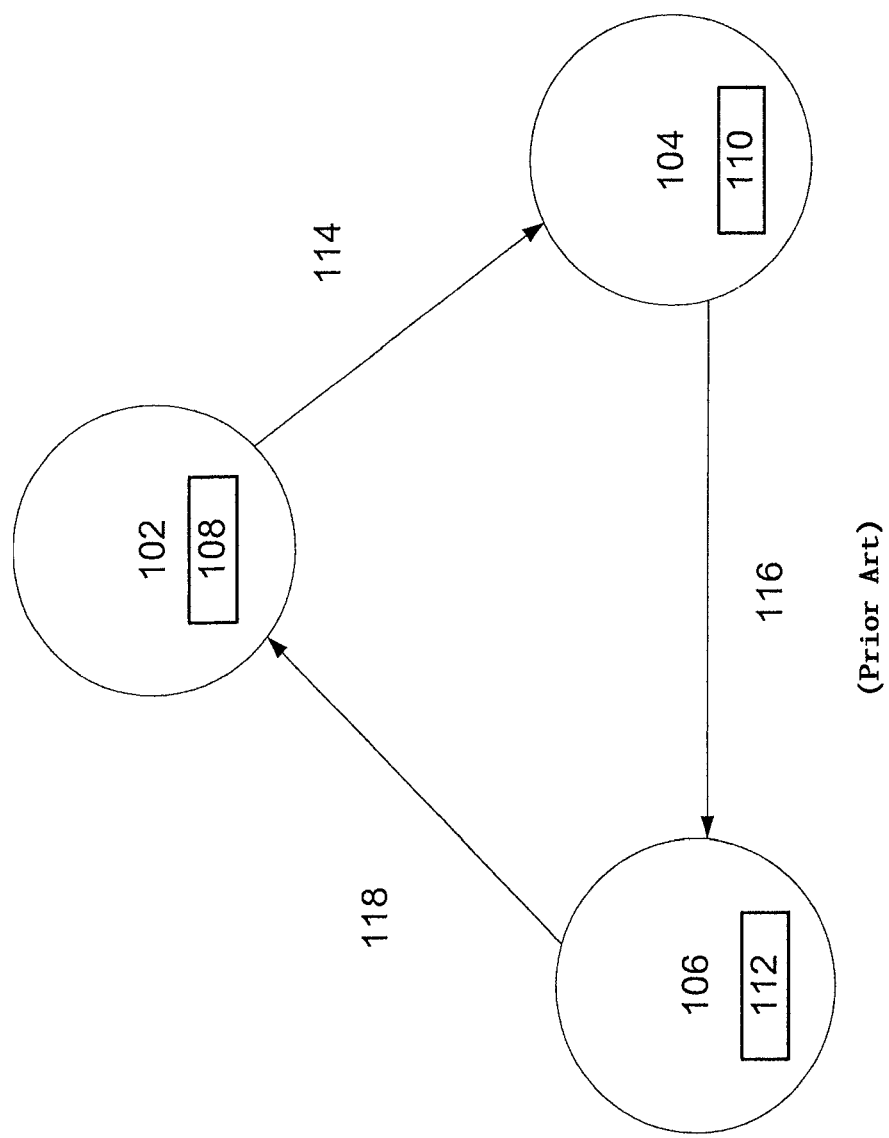
FIG. 1 is a diagram depicting a three-node communications system to illustrate the deadlock problem.
Figure 2A:
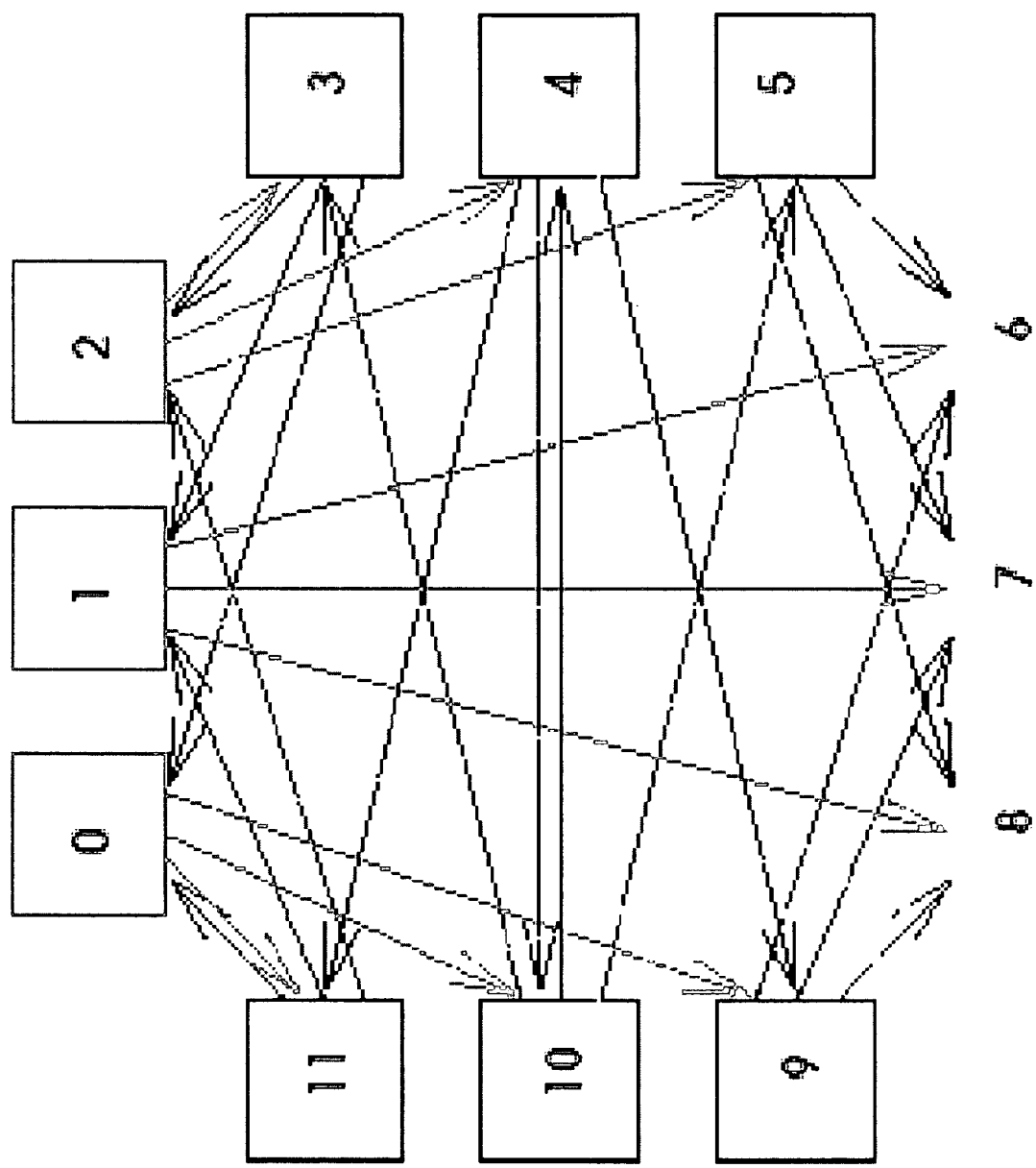
FIGS. 2A-2B are exemplary, simple Kautz topologies.
Figure 2B:
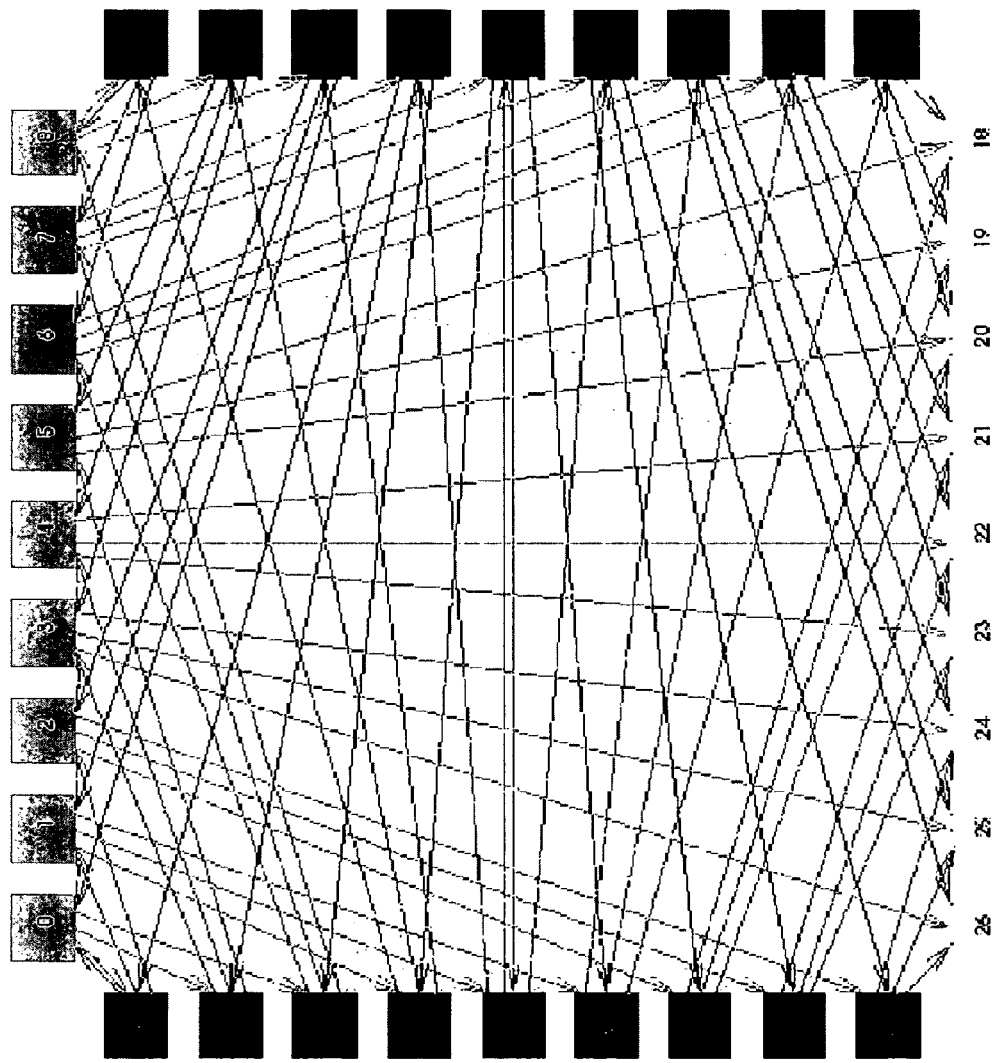

FIG. 2A depicts a very simple Kautz topology for descriptive convenience. The system is order 12 and diameter 2. By inspection, one can verify that any node can communicate with any other node in a maximum of 2 hops. FIG. 2B shows a system that is degree three, diameter three, order 36. One quickly sees that the complexity of the system grows quickly. It would be counter-productive to depict and describe preferred systems such as those having hundreds of nodes or more.

The table below shows how the order O of a system changes as the diameter n grows for a system of fixed degree k.

|  | Order | | |
| --- | --- | --- | --- |
| Diameter (n) | k = 2 | k = 3 | k = 4 |
| 3 | 12 | 36 | 80 |
| 4 | 24 | 108 | 320 |
| 5 | 48 | 324 | 1280 |
| 6 | 96 | 972 | 5120 |

If the nodes are numbered from zero to O-1, the digraph can be constructed by running a link from any node x to any other node y that satisfies the following equation:

$$y=(-x*k-j) \bmod O, \text{ where } 1 \leq j \leq k \quad (1)$$

Thus, any (x,y) pair satisfying (1) specifies a direct egress link from node x. For example, with reference to FIG. 2B, node 1 has egress links to the set of nodes 30, 31 and 32. Iterating through this procedure for all nodes in the system will yield the interconnections, links, arcs or edges needed to satisfy the Kautz topology. (As stated above, communication between two arbitrarily selected nodes may require multiple hops through the topology but the number of hops is bounded by the diameter of the topology.)

Each node on the system may communicate with any other node on the system by appropriately routing messages onto the communication fabric via an egress link. Under certain embodiments, any data message on the fabric includes routing information in the header of the message (among other information). The routing information specifies the entire route of the message. In certain degree three embodiments, the routing information is a bit string of 2-bit routing codes, each routing code specifying whether a message should be received locally (i.e., this is the target node of the message) or identifying one of three egress links. Naturally other topologies may be implemented with different routing codes and with different structures and methods under the principles of the invention.

Under certain embodiments, each node has tables programmed with the routing information. For a given node x to communicate with another node z, node x accesses the table and receives a bit string for the routing information. As will be explained below, this bit string is used to control various switches along the message's route to node z, in effect specifying which link to utilize at each node during the route. Another node j may have a different bit string when it needs to communicate with node z, because it will employ a different route to node z and the message may utilize different links at the various nodes in its route to node z. Thus, under certain embodiments, the routing information is not literally an "address" (i.e., it doesn't uniquely identify node z) but instead is a set of codes to control switches for the message's route.

Under certain embodiments, the routes are determined a priori based on the interconnectivity of the Kautz topology as expressed in equation 1. That is, the Kautz topology is defined, and the various egress links for each node are assigned a code (i.e., each link being one of three egress links). Thus, the exact routes for a message from node x to node y are known in advance, and the egress link selections may be determined in advance as well. These link selections are programmed as the routing information. This routing is described in more detail in the related and incorporated patent applications.

In certain preferred embodiments, embodiments of the invention may be practiced in a degree three, diameter six Kautz topology of order 972. The 972 nodes are tiled on modules each having 27 nodes. Each node may be a multi-processor node, e.g., six computer processors per node. Moreover, node to node transfers may be multi-lane mesochronous data transfers using 8B/10B codes.

Exemplary Node Switching Logic

Figure 3:
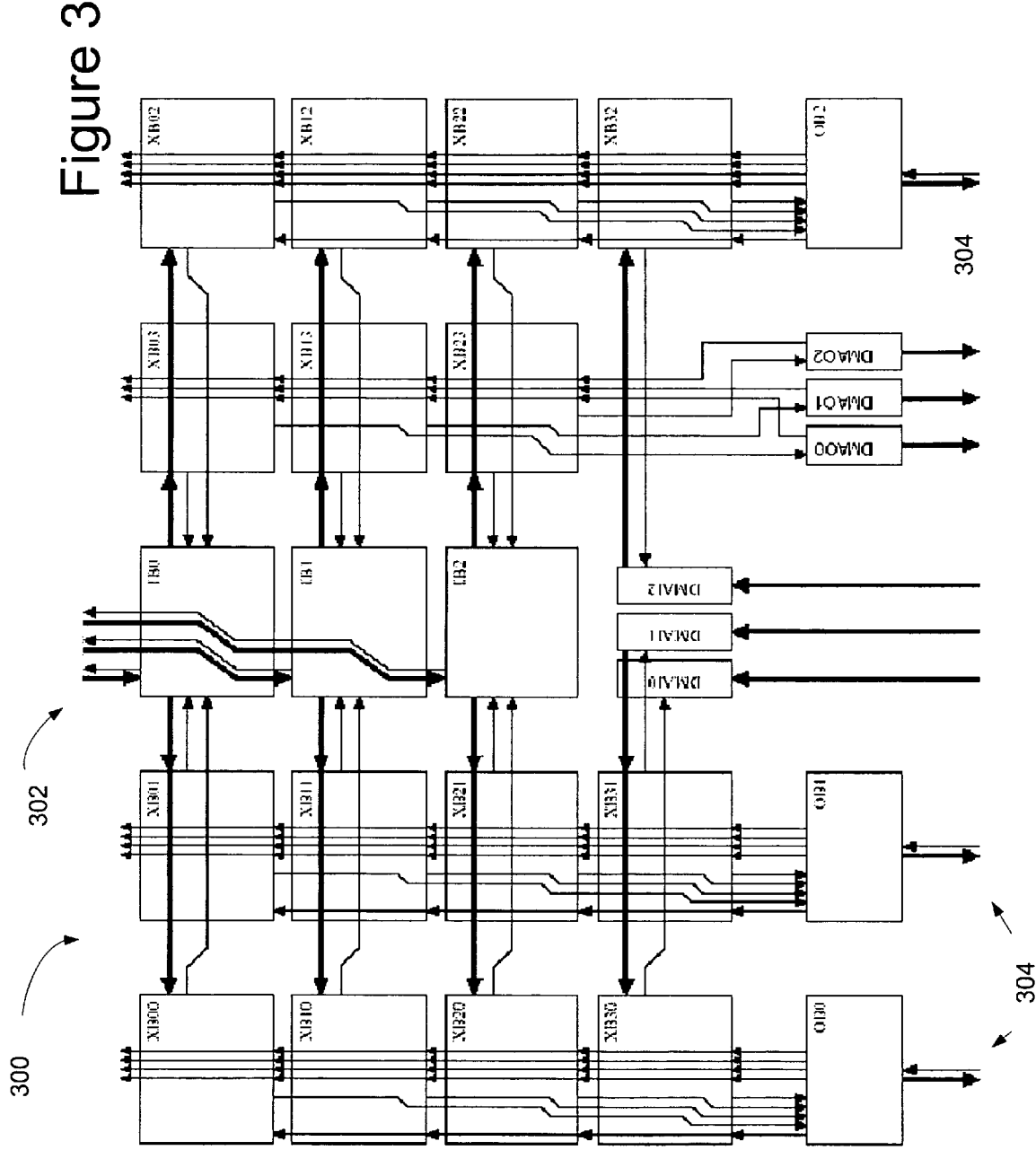
FIG. 3 is a block diagram of node switching logic according to certain embodiments of the invention.

FIG. 3 is a block diagram of the switching logic 300 used in processor nodes of certain embodiments of the invention that use a degree three topology. The switching logic receives data from (and provides some control information to) parent nodes via links 302. The logic provides data to (and receives some control information from) children nodes via links 304.

Item 302 identifies a set of lanes to receive data from parent nodes in the interconnection topology. They connect the input data to corresponding appropriate input blocks IB0-IB2. Item 304 identifies a set of lanes 304 to provide data to children nodes in the topology. They connect to the appropriate corresponding output blocks OB0-OB2. The links include data lanes or circuits (shown in heavy line) and a reverse control channel (shown in lighter line shading).

The switching logic includes various crosspoint buffers, e.g., XB 00, for each cross point connection. Thus, if data from input link 0 (from the set 302) is addressed to egress on a link 2 (from the set 304), then the data will be stored in cross point buffer XB 02, if the data needs to be stored in this node. (In some situations the data can cut through and avoid local buffering.)

The input blocks IBx distribute incoming data from the input links 302 to one of four cross point buffers XBxx based on the routing field in the packet's header. It also performs various other functions such as checking CRC on the packet, determining if a packet has been poisoned (to support cut-through functionality), supporting flow control with packet sequence numbers, and the like. It is also responsible for passing control packets to parent nodes via the control circuits of input links 302. In certain embodiments, the IB also modifies the routing information in the packet header by shifting the contents two bits and shifting in the two-bit code corresponding to the link on which the packet was received. (In this fashion, the LSBs—or MSBs depending on the embodiment—may be used to identify the egress link a packet should use as it is received at the next node.)

The output blocks OBxs, among other things, are responsible for performing arbitration among the four cross point buffers XBxx attached to a given OB. They also maintain a replay buffer used in flow control and compute CRC on data outbound on egress links 304.

The DMA blocks are responsible for performing remote DMA actions to the node DMAIx or output from the node DMAOx.

Virtual Channel Assignment

Under certain embodiments, as a packet is created it is also assigned a virtual channel number, and this number is encoded in the packet header along with other information such as the routing information discussed above. The initial value for a virtual channel number is determined by software at the time the routing tables are constructed and the virtual channel is encoded in the routing tables.

Unlike conventional approaches, under preferred embodiments the virtual channel number may be changed dynamically as the message moves along its route. It can be shown that this dynamic assignment of virtual channels still prevents cycles of resource dependency, and it can also be shown that this technique requires fewer buffer resources than the conventional static and constant assignment of virtual channel numbering.

For example, under certain embodiments, when a message arrives at a node, the virtual channel number is decremented if the current node number is greater than both the node number of the parent node (i.e., node from which the message came on immediately prior hop) and the node number of the child node (i.e., node to which the message is going to on the next hop). The basic requirement in assigning the initial virtual channel is simply that its assignment value must be large enough so that it does not become negative as the packet makes its way to the final destination. That could be accomplished by starting every packet with a virtual channel equal to the maximum number of decrements it might have to encounter, but there are other ways to program as well, e.g., starting with the highest virtual channel. Alternatively, rules could be changed and still keep the principle of dynamic assignment, e.g., the channel number can be incremented, or the comparison can be "less than" rather than "greater than".

Under certain embodiments, the modification of virtual channel numbers while the message is en route may be implemented as follows. The nodes in the topology are each assigned a corresponding node number identification. For example, in a Kautz topology of order 972, the nodes may be assigned numbers from 0 to 971. The interconnectivity is known and satisfies equation (1) above. The nodes' connections are assigned to the various egress and ingress links of each node. Thus the node to link mapping may be determined a priori. From this, it may be determined for each node whether a given input link/output link pair satisfies the rule for changing the virtual channel number.

Each input block IB, in these embodiments, is constructed to have a programmable register to indicate whether the input link/output link pairing should cause a change in virtual channel number. For example, the register may have a bit for each egress link (and by design the register is associated with a particular input link to which the IB is connected). Each bit may then indicate whether the IB should change the virtual channel number for packets destined for the corresponding egress link. Any packet received on that input link has its routing information in its header analyzed to see which egress link should be used. The bit register is then considered, and depending on the bit setting, the virtual channel number may be changed, e.g., decremented. The packet is then stored in the relevant corresponding cross point buffer XBxx, or it may immediately forwarded on an egress link if the egress link is available and arbitration rules allow such immediate bypass. Thus, if a packet arrives on a link and is assigned virtual channel 3, it will be stored in a local buffer (in the corresponding XB for the input link/output link pair) for virtual channel 3. However, depending on the node numbers for the current, parent and child nodes, the virtual channel may be changed to 2, e.g., the packet header may be modified to indicate virtual channel 2. That packet (though stored in a buffer slot for virtual channel 3) will arbitrate for downstream buffer resources corresponding to the new, dynamically-assigned virtual channel 2.

Under certain embodiments, each cross point buffer XBxx has 16 buffers. Some portion of these are dedicated for specific virtual channel assignment (e.g., as defined in a programmable register). The remainder may then be used in a common pool of buffers that can be dynamically allocated for any virtual channel. For a diameter six Kautz topology, only three virtual channels are needed. Thus three of the buffers are dedicated to the three virtual channels, and the remaining buffers are assigned to a pool of buffers that may be dynamically allocated to any virtual channel. Thus, in embodiments using 16 buffers per cross point XBxx, 13 buffers can be used for the pool. That is, a virtual channel need not be fixed to one and only one buffer and instead can be associated with a set of buffers, the actual size of which set will be dynamic, based on traffic flow. For example, if one virtual channel is particularly busy, it may use several buffers at a given cross point. The XBxx includes logic to associate a virtual channel number with each buffer (including those in the pool) and to record the order of arrival for data in the buffers. In this way, the data can be forwarded or consumed in the same order as it arrived (on a per channel basis). By efficiently assigning virtual channels (i.e., using less channels to avoid deadlock), more buffers may be associated with the pool, which in turn should improve data flow and reduce latency.

In certain embodiments, the amount of buffers dedicated to virtual channels (i.e., the fixed assignments) is programmable. Among other things, this facilitates the use of the module design in various system designs. For example, by reprogramming the amount of buffers to directly map to virtual channels, the module design may be used in systems of different diameter (larger diameter systems need more virtual channel assignments to avoid deadlock as discussed above).

FIG. 4 is a flow diagram depicting steps for virtual channel assignment according to certain embodiments of the invention.

The logic starts in step 402 and progress to step 404 in which node numbers are assigned. As described above, in some embodiments, this is as simple as assigning nodes unique integers to identify the nodes, e.g. 0 to 971. However, the unique identifier can be a number (not necessarily decimal), a string of characters, or other code. Any type of unique identifier can be used as long as they are ordered by some known set of ordering rules. Ordered means that they can be compared to one another, and it is possible to determine if any unique identifier is less than, greater than, or equal to another unique identifier.

In step 406 a particular node creates a packet and populates the packet header with appropriate routing information, including for example an initial assignment of virtual channel. This initial assignment may be pulled from a table lookup in conjunction with retrieving other routing information.

The packet is eventually sent and eventually received by a child node in step 408.

The current node compares its node number to the node number of the parent node (the node which sent the packet) and the next node, i.e., child node (assuming this is not the final node in the route). As explained above, in certain embodiments this comparison is done by use of programmable registers that have pre-recorded the comparison results based on input link/output link mappings. In other embodiments, the node numbers may be directly available and in such case the node numbers may be consulted and compared directly.

In step 412, the results of the comparison are considered in conjunction with the dynamic assignment rules. For example in some embodiments, the current node is compared to the parent and child nodes of the packet route to see if the current node number is greater than both the parent and the child. Other combinations of rules and comparisons exist, which can be shown to avoid cycles of resource dependency.

If the comparison indicates that the virtual channel identifiers should be changed while the packet is en route, the flow proceeds to step 414. In step 414, the virtual channel number is changed. For example, in the above embodiments, the virtual channel number is decremented, if the current node is greater than both the parent and child node numbers. Generally speaking, however, the virtual channels may be considered as ordered identifiers in a set of identifiers (e.g., integers). Each virtual channel has an adjacent channel identifier in the ordered set of channel identifiers, and step 414 changes the virtual channel identifier accordingly. So if the identifiers were simply integers, next would mean the next highest integer.

In step 416, the packet is either stored or forwarded accordingly using the virtual channel numbers assigned to the packet (and possibly changed).

Arbitration

Multiple buffers may contend for an egress link. In the embodiment of FIG. 3, there are three cross point buffers associated with each egress link. For example, XB00, XB10, and XB20 are all associated with output block OB0 and output link 0. (Another cross point buffer XB30 is depicted but this is associated with a DMA engine not an input link from another node.) Each XBxy may have data that is in contention for use of egress link y. In addition, within each given XB, there are multiple buffers (e.g., 16), and thus there may be more than one buffer within an XB that may wish to contend for use of an egress link (perhaps on the same virtual channel or perhaps on a different virtual channel).

In certain embodiments, arbitration is performed within an XBxy to select a buffer from within that XB to bid for contention to egress link y. Arbitration is also performed at the OBy to select from among the various XBxys having data bidding for contention on link y.

Under certain embodiments, the cross point buffer XB does not identify a buffer entry as available for transmission on the egress link (i.e., bid for contention), until the XB can determine that there is sufficient space for the packet in the downstream node. In short, a debit/credit mechanism is arranged in which the receiving node (i.e., the IB of the downstream node) tells the sending node (i.e., the OB of the sending node) how much space is available in the receiver's buffers for each virtual channel and port. (This buffer status in certain embodiments is conveyed from the downstream node to the upstream node using the control channel, e.g., one 16 bit buffer mask per XB connected to the relevant internode link.) For example, if a packet route requires that the packet arrive at an input link 0 on a node K and leave on egress link 2, and the route also requires that the packet arrive at downstream node D and leave node D on egress link 1, the packet will be stored in XB02 of node K. XB02 will keep that data in a buffer, until XB02 can determine that there is appropriate buffer space available in downstream node D's cross point buffer XB?1. (The '?' is used to signify that the topology does not require downstream node D to connect egress link 2 of the upstream node as an input link 2. So if the downstream node D connected its input link I to the upstream node's egress link 2, then the upstream node would determine whether downstream node D's XB11 had buffer space.)

To determine whether a buffer entry should bid for contention for an egress link, the XBxxs query the buffer busy masks to determine if space is available in downstream nodes. If space is available, the XB identifies the relevant packet as one that can bid for contention for use of the egress link. For example, if the packet in the above example is traveling on virtual channel 3, XB02 will query a relevant buffer busy mask to determine if the corresponding slot for virtual channel 3 is empty on the downstream node D, or if there are any free buffers in the pool. If the corresponding slot for virtual channel 3 is empty (or there is space in the pool), the packet will be identified as available to contend for the egress link. (Moreover, in certain embodiments, the packet may be modified to specify the particular slot it should go into, when it is received in node D; i.e., buffer entry slot is recorded in the packet header separately from the virtual channel identifier in the packet header.) As will be explained in more detail below, the XB has a conservative (worst case) estimate of whether the relevant buffers are busy.

Each XB (by definition associated with an input link/output link pair) keeps track of the order in which a packet arrived in the XB, and the virtual channel to which that packet is assigned. If multiple buffers within an XBxx may contend for use of the egress link (e.g., because relevant downstream buffers are free) the XB selects the oldest such packet within the XB to contend for use of the link.

In certain embodiments, the output block OB tracks buffer busy status. It does this both for the local buffers and for the downstream buffers for the node to which it connects via its associated egress link. When a packet is sent, the OB marks the corresponding buffers downstream as being busy. Buffers are marked as free when a control packet from a downstream node indicates that the buffer has been forwarded or consumed (this control packet need not be a packet-by-packet acknowledgement). The control packet also contains "busy masks" for each of the downstream XBs. Thus, for example, a downstream IB may send four 16 bit masks to indicate whether buffers are free or busy in each XB the IB is connected to, including the XB for DMA processing, and the OB of the upstream node will maintain such status information so the upstream node's XBxxs know when they should bid for contention. Thus the OB maintains busy masks for the local XBs to which it is connected, and also busy masks for the downstream XBs connected to the egress link. Performing a logical OR on the busy masks provides a conservative (worst case) picture of whether buffers are busy.

Figure 6:
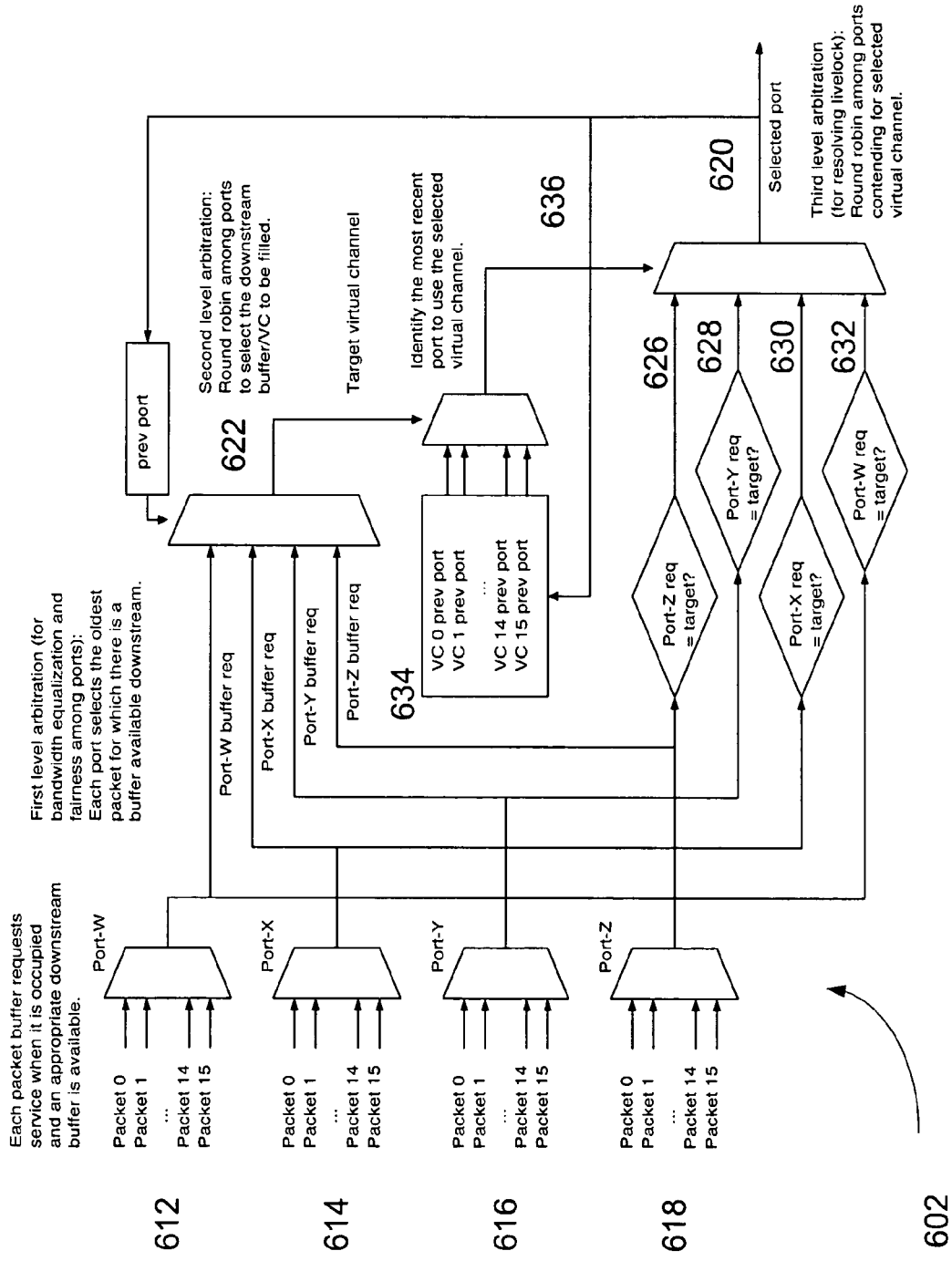
FIG. 6 is an architectural diagram depicting arbitration logic to avoid livelock of packet transmission according to certain embodiments of the invention.

FIG. 5 is a conceptual diagram illustrating how an OB may select which buffer should gain access to an egress port, and FIG. 6 is a block diagram of exemplary logic for such. Both should be referred to conjointly in connection with the following description. In short, the logic seeks the XBxy that has been waiting the longest for an egress link y. However, before granting access to that XBxy, it also seeks to see if any XBxy has a buffer bidding for contention for that link and for the virtual channel that has been waiting longer. In this fashion, livelock of virtual channel traffic is avoided (i.e., absent such, one might be fair to XBxys but be unfair—and even starve— traffic for particular virtual channels on a link).

The output block may have as many as four XBxxs bid for contention of the output link, in the above-described embodiments. In FIG. 6, the XBxxs are depicted as ports 612-618, and packets 0-15 in each port refer to the buffers in an XB. In certain embodiments, the output block considers the XBxxs that are contending for use of the egress link 620 and selects 622 the least recently chosen XB, which is then requesting use of the egress link. Aging vectors and other techniques may be utilized for such. This is shown at 502 and 504 in FIG. 5.

The downstream egress link (i.e., next port or "NP" in FIG. 5) and virtual channel number (i.e., VC) are then identified; see 506 and 624. Then all XBxxs that have buffers that were bidding for contention (i.e., the oldest for that XBxx that were ready to be transmitted to an available downstream buffer) that are also addressing the same downstream egress link (or next port) and the same virtual channel are identified. This is shown in 508 and 626-632.

The virtual channel and NP are used to consult (e.g., index) into a history structure 634, which records the last XBxx to have won use of the egress link for that particular downstream egress link (NP) and virtual channel (VC) pair. This is shown in 510.

The OB logic then starts with the next XBxx identification (i.e., from the one identified in the history structure) and cycles through in round robin fashion 636 to see if an XB is bidding for use of the egress link with the same NP and VC. If so, that XB will be granted access. This will continue in round robin fashion, to identify XBs with the same NP and VC. This is shown in 512. Thus in the example of FIG. 5, even though XB12 was selected because it was the XB that had least recently used the OB, it is not the first to use the egress link in this arbitration event. Instead, XB32 precedes XB12 in this arbitration event. This was done to combat livelock of the link/VC pair. XB32 may have used the OB more recently than XB12 but it was not for the particular link (NP) and VC of this event. Indeed the history structure revealed in this instance that XB12 in fact was the last XB to send data to this NP/VC pair and the arbitration result in effect avoided XB12 from starving out XB32 for this NP/VC pair. Moreover, timers were avoided. As a result, traffic on all virtual channels is treated fairly, a result that is difficult to achieve even with complex timers.

Many of the teachings here may be extended to other topologies including de Bruijn topologies. Likewise, though the description was in relation to large-scale computing system, the principles may apply to communication fabrics.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A method of preventing livelock in a multiprocessor computer system having a plurality of processing nodes, the processing node interconnected as defined by an interconnection topology, in which a communication from a source processing node to a target processing node passes through one or more intermediate nodes en route to the target processing node, and in which each processing node has a plurality of input links and a plurality of egress links, the method comprising:

associating a set of virtual channels to each link in the interconnection topology, each virtual channel having an associated virtual channel identifier;

for each communication between a source processing node and a target processing node in the interconnection topology, assigning a virtual channel to convey the communication;

at a processing node in a route of the communication, buffering communication data from the plurality of input links in cross point buffers, each communication including a respective virtual channel identifier, the respective virtual channel identifier indicating which of the multiple virtual channels on which to transmit the communication to the target processing node;

a subset of the cross point buffers bidding for use of an egress link;

arbitrating among the subset of cross point buffers and selecting a communication from the cross point buffers on which to transmit over the egress link based on predetermined arbitration rules;

identifying, based on the respective virtual channel identifier, the virtual channel of the selected communication;

determining whether any other communications bidding for use of the egress link are associated with the identified virtual channel and if so whether any communication has been waiting longer than the selected communication;

allowing a communication bidding for use of the egress link and associated with the identified virtual channel and that has been waiting longer than the selected communication to use the egress link before the selected communication;

providing a first set of data packet buffers to store a first set of data packets, each data packet buffer in the first set configured to request forwarding of a respective stored data packet when a buffer is available in a downstream processor node in the interconnection topology;

providing a second set of data packet buffers to store a second set of data packets, each data packet buffer in the second set configured to request forwarding of a respective stored data packet when a buffer is available in a downstream processor node in the interconnection topology;

providing a third set of data packet buffers to store a third set of data packets, each data packet buffer in the third set configured to request forwarding of a respective stored data packet when a buffer is available in a downstream processor node in the interconnection topology;

storing first history information indicating an order of receiving data packets stored in the first set of data packet buffers;

storing second history information indicating an order of receiving data packets stored in the second set of data packet buffers;

storing third history information indicating an order of receiving data packets stored in the third set of data packet buffers;

utilizing the first history information to identify a first data packet, the first data packet being an oldest data packet in the first set of data packet buffers for forwarding through the interconnection topology;

utilizing the second history information to identify a second data packet, the second data packet being an oldest data packet in the second set of data packet buffers for forwarding through the interconnection topology;

utilizing the third history information to identify a third data packet, the third data packet being an oldest data packet in the third set of data packet buffers for forwarding through the interconnection topology;

based on servicing history information, identifying that the third set of data packet buffers was least recently chosen from the first set, the second set, and the third set for forwarding of a respective data packet to a target destination; and in response to identifying that the third set of data packet buffers was least recently chosen from the first set, the second set, and the third set for forwarding of a respective data packet to a target destination, initiating transmission of the third data packet over a virtual channel as specified by a virtual channel identifier value in the first data packet.

2. The method of claim 1 further including recording, in a history structure, which crosspoint buffer has previously used the egress link and the virtual channel identifier for the communication when the egress link was previously used, the method further comprising:

consulting the history structure to determine which of the multiple cross point buffers has been waiting longer to transmit a communication on the egress link.

3. The method of claim 1, wherein each cross point buffer includes a set of buffers for holding communications and wherein the cross point buffer selects a buffer to bid for use based on a least recently used rule.

4. The method as in claim 1 further comprising:

allocating a first set of buffers to store data packets transmitted on a first virtual channel;

allocating a second set of buffers to store data packets transmitted on a second virtual channel; and based on detecting an excessive amount of traffic flow on the first virtual channel, initiating allocation of at least one supplemental buffer from a dynamic pool of buffers to temporarily store data packets transmitted on the first virtual channel.

5. The method as in claim 1 further comprising:

assigning node numbers to each of the processing nodes in the interconnection topology;

receiving a particular data packet at a given node in the interconnection topology;

identifying a node number in the particular data packet, the node number in the particular data packet identifying a destination node to which the particular data packet is transmitted;

comparing the node number identified in the particular data packet to a node number of the given node;

based on results of the comparing, modifying a value of a virtual channel identifier value in the particular data packet; and storing the particular data packet in a respective buffer dedicated for storing data packets that have been assigned the virtual channel identifier value.

6. A method of preventing livelock, the method comprising:

defining a set of virtual channels on which to forward data packets through an interconnection topology of multiple processor nodes;

at each processor node in the interconnection topology, allocating sets of buffers for temporary storage of data packets transmitted through the interconnection topology, each of the data packets having a respective virtual channel identifier value indicating a corresponding virtual channel on which to forward a corresponding data packet;

at an intermediate processor node in the interconnection topology between a sending node and a receiving node:

receiving a particular data packet, the particular data packet being transmitted through the interconnection topology from the sending node to the receiving node;

storing the particular data packet in a first set of buffers;

in a first arbitration stage at the intermediate processor node:

identifying a respective oldest data packet in each of the sets of buffers;

identifying that the particular data packet is an oldest data packet amongst multiple data packets in the first set of buffers;

in response to comparing ages of oldest data packets in each of the sets of buffers, identifying that the particular data packet has been waiting longest amongst the respective oldest data packets for transmission on the virtual channel from the intermediate processing node to a next hop node towards the receiving node;

in a second arbitration stage at the intermediate processor node:

identifying a particular virtual channel on which to forward the particular data packet, the particular virtual channel being specified by a virtual channel identifier in the particular data packet;

identifying a set of buffers storing data packets that contend for use of the particular virtual channel, each of the data packets in the identified set of buffers having a same respective virtual channel identifier value as the virtual channel identifier in the particular data packet;

accessing history information to determine a given set of buffers of the identified set of buffers to most recently transmit a respective data packet on the particular virtual channel, the given set of buffers being a second set of buffers of the sets of buffers;

in a third arbitration stage at the intermediate processor node:

in lieu of selecting the particular data packet from the first set of buffers for transmission over the particular virtual channel, selecting a data packet from the second set of buffers;

transmitting the selected data packet from the second set of buffers over the particular virtual channel.

7. The method as in claim 6 further comprising:

subsequent to transmitting the selected data packet from the second set of buffers over the particular virtual channel, initiating transmission of the particular data packet over the particular virtual channel.

8. The method as in claim 7, wherein transmission of data packets on the particular virtual channel is done in a round robin manner such that a data packet is transmitted from each of the sets of buffers contending to transmit a respective data packet over the particular virtual.

9. The method as in claim 8 further comprising:

assigning node numbers to each of the processing nodes in the interconnection topology;

receiving a communication at a given node in the interconnection topology;

identifying a node number in the communication, the node number in the communication indicating a destination node to which the communication is transmitted;

comparing the node number identified in the communication to a node number of the given node;

based on results of the comparing, modifying a value of a virtual channel identifier value in the communication; and storing the communication in a respective buffer dedicated for storing data packets that have been assigned the virtual channel identifier value.

10. The method as in claim 6 further comprising:

implementing a multi-stage arbitrator to facilitate communication of the data packets to respective target destinations in the interconnection topology; and wherein receiving the data packets includes receiving a given data packet associated with a direct memory access transfer between a source processing node and a destination processing node in the interconnection topology.

11. The method as in claim 6 further comprising:

providing a first set of data packet buffers to store a first set of data packets, each data packet buffer in the first set configured to request forwarding of a respective stored data packet when a corresponding buffer is available in a downstream processor node;

providing a second set of data packet buffers to store a second set of data packets, each data packet buffer in the second set configured to request forwarding of a respective stored data packet when a corresponding buffer is available in a downstream processor node; and providing a third set of data packet buffers to store a third set of data packets, each data packet buffer in the third set configured to request forwarding of a respective stored data packet when a corresponding buffer is available in a downstream processor node.

12. The method as in claim 11 further comprising:

storing first history information indicating an order of receiving data packets stored in the first set of data packet buffers;

storing second history information indicating an order of receiving data packets stored in the second set of data packet buffers;

storing third history information indicating an order of receiving data packets stored in the third set of data packet buffers;

utilizing the first history information to identify a first data packet, the first data packet being an oldest data packet in the first set of data packet buffers for forwarding through the interconnection topology;

utilizing the second history information to identify a second data packet, the second data packet being an oldest data packet in the second set of data packet buffers for forwarding through the interconnection topology; and utilizing the third history information to identify a third data packet, the third data packet being an oldest data packet in the third set of data packet buffers for forwarding through the interconnection topology.

13. The method as in claim 12 further comprising:

in response to queries to downstream processing nodes, receiving communications indicating that at least one buffer is available in the downstream processing nodes, reception of the communications indicating that the first data packet and the second data packet can contend for use of an egress link of the given processing node.

14. The method as in claim 12 further comprising:

based on servicing history information, identifying that the first set of data packet buffers was least recently chosen from the first set, the second set, and the third set for forwarding of a respective data packet to a target destination;

identifying a virtual channel and next hop processing node associated with the first data packet;

identifying that the third data packet specifies a same virtual channel identifier value and next hop processing node as the first data packet;

based on the servicing history information, identifying that the first set of buffers has been waiting longer to forward a data packet than the third set of buffers;

forwarding the first data packet on the egress link from the given processing node; and subsequent to forwarding of the first data packet on the egress link from the given processing node, initiating forwarding of the third data packet on the egress link.

15. The method as in claim 14 further comprising:

forwarding the first data packet and the third data packet in accordance with a round robin forwarding algorithm.

16. A method of preventing livelock in a multiprocessor computer system having a plurality of processing nodes, the processing node interconnected as defined by an interconnection topology, in which a communication from a source processing node to a target processing node passes through one or more intermediate nodes en route to the target processing node, and in which each processing node has a plurality of input links and a plurality of egress links, the method comprising:

associating a set of virtual channels to each link in the interconnection topology, each virtual channel having an associated virtual channel identifier;

for each communication between a source processing node and a target processing node in the interconnection topology, assigning a virtual channel to convey the communication;

at a processing node in a route of the communication, buffering communication data from the plurality of input links in cross point buffers, each communication including a respective virtual channel identifier, the respective virtual channel identifier indicating which of the multiple virtual channels on which to transmit the communication to the target processing node;

a subset of the cross point buffers bidding for use of an egress link;

arbitrating among the subset of cross point buffers and selecting a communication from the cross point buffers on which to transmit over the egress link based on predetermined arbitration rules;

identifying, based on the respective virtual channel identifier, the virtual channel of the selected communication;

determining whether any other communications bidding for use of the egress link are associated with the identified virtual channel and if so whether any communication has been waiting longer than the selected communication;

allowing a communication bidding for use of the egress link and associated with the identified virtual channel and that has been waiting longer than the selected communication to use the egress link before the selected communication;

storing a first set of data packets in a first set of buffers, each data packet in the first set of buffers indicating a respective virtual channel on which to be forwarded in the interconnection topology;

storing a second set of data packets in a second set of buffers, each data packet in the second set indicating a respective virtual channel on which to be forwarded in the interconnection topology;

storing a third set of data packets in a third set of buffers, each data packet in the third set indicating a respective virtual channel on which to be forwarded in the interconnection topology;

identifying a first data packet as being an oldest stored data packet in the first set of buffers;

identifying a second data packet as being an oldest stored data packet in the second set of buffers;

identifying a third data packet as being an oldest stored data packet in the third set of buffers;

identifying that the first data packet is an oldest stored data packet amongst the first data packet, the second data packet, and the third data packet;

identifying a virtual channel identifier value in the first data packet, the virtual channel identifier value in the first data packet indicating a virtual channel on which to transmit the first data packet, the virtual channel being one of multiple virtual channels in the interconnection topology;

identifying that the third data packet includes a same virtual channel identifier value as the first data packet;

accessing history information indicating which one of the first set of buffers and the third set of buffers most recently transmitted a data packet on the virtual channel as specified by the virtual channel identifier value in the first data packet; and in response to detecting that the third set of buffers was least recently serviced to transmit a data packet on the virtual channel, initiating transmission of the third data packet on the virtual channel as specified by the virtual channel identifier value in the first data packet.

* * * * *